Aug. 24, 1965     J. L. SZWARGULSKI     3,202,173
CARBURETOR
Filed Oct. 2, 1961
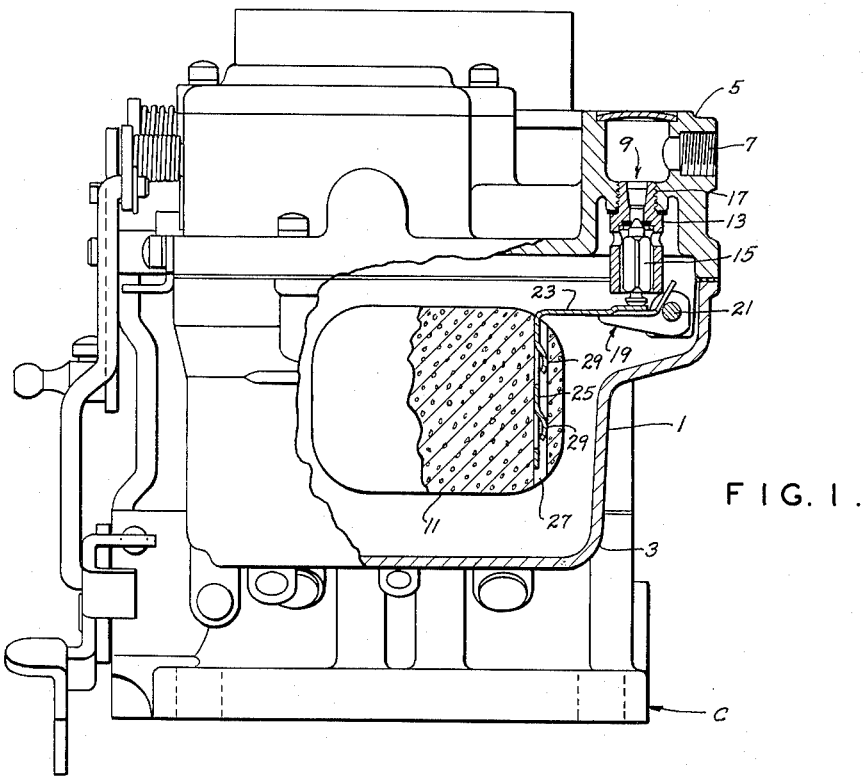
FIG. 1.
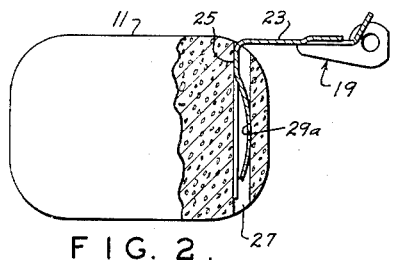
FIG. 2.
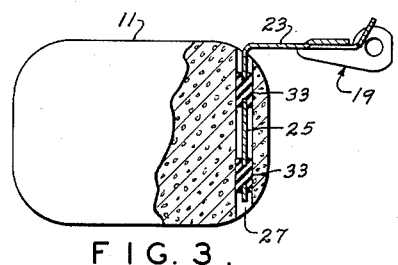
FIG. 3.
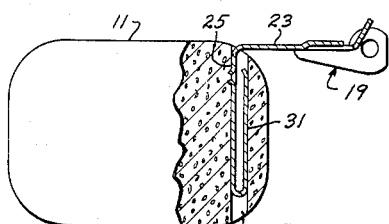
FIG. 4.
*INVENTOR.*
JESSE L. SZWARGULSKI
BY
AGENT

United States Patent Office 3,202,173
Patented Aug. 24, 1965

3,202,173
CARBURETOR
Jesse L. Szwargulski, Florissant, Mo., assignor to ACF Industries, Incorporated, New York, N.Y., a corporation of New Jersey
Filed Oct. 2, 1961, Ser. No. 142,364
2 Claims. (Cl. 137—426)

This invention relates to carburetors, especially carburetors for use on automotive engines, and more particularly to an improved float and lever assembly for such carburetors.

It will be understood that a carburetor such as is used on the engine of an automotive vehicle has a fuel bowl for containing fuel to be supplied to a mixture conduit of the carburetor. In the mixture conduit, fuel is mixed with air, and the mixture is supplied to the intake manifold of the engine for distribution to the engine cylinders. Fuel is adapted to be pumped from the fuel tank of the vehicle to the fuel bowl under control of a valve which is in turn controlled by a float in the fuel bowl, the arrangement being such that as fuel is consumed and the level of fuel in the bowl drops, the float drops to allow the valve to open for delivery of additional fuel to the bowl. Conventionally, the float is a hollow sheet metal body secured to a pivoted valve-actuating lever made of sheet metal. Manufacture of such floats involves sheet metal stamping operations, and assembly and soldering of the float parts, and assembly of a float and lever involves soldering together of the float and lever. Also, adjustment of the float for determining the level of fuel to be maintained in the bowl is commonly made by bending the lever. Since the inlet valve to the fuel bowl is normally a longitudinal needle which operates by axial movement onto a valve seat, optimum control of the valve is by applying the closing force of the float lever along the axis of the valve. Adjustment of the float position by bending the float lever causes the closing force of the float to be applied at an angle to the needle axis thus requiring a greater closing force on the needle.

Accordingly, among the several objects of this invention may be noted the provision of a float and lever assembly as to which the float is economically provided as a one-piece body of a suitable cellular plastic foam material which is buoyant in fuel, the float being assembled with the lever in such manner as to permit vertical sliding adjustment of the float relative to the lever, without any necessity for bending the lever, change in position of the float being substantially proportional to the adjustment; and the provision of a float and lever assembly such as described in which the float, once it is adjusted on the lever, is securely held in adjusted position. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, FIG. 1 is a view in elevation of a carburetor with parts broken away and shown in section to illustrate a float and lever assembly of this invention used in the carburetor; and FIGS. 2, 3 and 4 are views in elevation with parts broken away and shown in section showing modifications of the float and lever assembly.

Corresponding reference characters indicate corresponding parts throughout the several views of the drawings.

Referring to FIG. 1 of the drawings, there is indicated at C a carburetor having the usual body 1 formed to provide a fuel bowl 3 and provided with the usual cover 5. It will be understood that the carburetor will have the usual mixture conduit, throttle valve, high-speed fuel system for delivering fuel from the bowl to the mixture conduit when the throttle valve is open and the engine is in operation, and idle system, all these being conventional and hence not illustrated. Fuel is adapted to be delivered to the fuel bowl via a fuel inlet 7 in cover 5 under control of a valve 9 which is in turn controlled by a float 11. As shown, valve 9 is a needle valve comprising a needle seat body 13 and a needle 15. The needle seat body 13 is threaded in a vertical tapped hole 17 in the cover 5, and extends down into the upper part of the fuel bowl. Needle 15 is vertically slidable in the needle seat body and extends out of the lower end of the needle seat body, its lower end engaging a lever 19 pivoted at one end on a horizontal pin 21 which extends across a portion of the bowl. As shown, the lever has a generally horizontal portion 23 which extends from pin 21 under the lower end of the needle, and a generally vertical free end portion 25 extending down from the free end of horizontal portion 23.

It is generally desirable to retain the lever portion 23 normal to the needle 15 so that the closing force applied to the needle will be along the axis of needle 15 and so that any lateral force will be negligible. This results in maintaining proper centering of the needle in its seat body 13 and minimizes the force required to close the valve 15. Any adjustment of float 11 by bending lever 23, places lever 23 at an angle other than normal to the axis of needle 15. Then, when the float raises, the force applied by lever 23 against valve is at an angle to the axis of needle 15 and tends to force the needle to one side of the valve fitting 17 in which it slides. This will prevent the end of needle 15 from properly centering in the valve seat and preclude proper closing of the inlet valve. Also the lateral force applied to needle 15 will cause increased friction between the needle and fitting 17 due to a binding action. Thus a greater force will be required to close valve 15 with a resultant higher level of fuel in bowl 3. Because of manufacturing tolerances, some adjustment of the float level within bowl 3 is necessary on all mass produced carburetors. The invention is to a means for eliminating the necessary float adjustment by bending lever 23.

Float 11 comprises a one-piece body of cellular closed-cell material which is buoyant in fuel, such as rigid cellular cellulose acetate, for example. This type of material may also be referred to as plastic foam material, and is a relatively light weight, rigid, and permanently buoyant material in view of its closed-cell characteristic, i.e., its noninterconnected cell structure. In accordance with the invention, float 11 is formed with a generally vertical opening 27 extending from top to bottom. Portion 25 of lever 19 is frictionally received in this opening, and the float is slidable on portion 25 of lever 19 for assembly with and adjustment relative to the latter. As appears in FIG. 1, lever 19 is formed from sheet metal, and portion 25 of the lever consists of a flat strip portion of the sheet metal from which a pair of spring fingers 29 are struck out to provide for such frictional engagement with the float as securely to hold the float in adjusted position on portion 25.

It will be apparent that as the level of fuel in the bowl 3 drops, the float 11 will drop, allowing needle 15 to open. Then, as the fuel level rises, the float rises and needle 15 closes. With the float made of substantially rectangular shape, and with adjustment of the float being made by vertical sliding on portion 25 of the lever, the float may be positioned on lever portion 25 to provide a closing of needle valve 15 at the desired fuel level in bowl 1. This adjustment eliminates any adjustment of the float level by bending the lever arm 23 which would destroy the relationship of lever 23 normal to the axis of needle 15 with the resulting disadvantages described above.

FIG. 2 illustrates a modification in which portion 25 of the lever has a relatively long struck-out spring finger 29a to provide the frictional engagement with the float, instead of two short fingers 29 as in FIG. 1.

FIG. 3 illustrates another possible modification in which resilient buttons 33, made of fuel-resistant synthetic rubber, for example, are riveted in holes in portion 25 of the lever to provide the frictional engagement with the float.

FIG. 4 illustrates another modification in which portion 25 of the lever has a bent-back end portion 31 providing a hairpin type of spring arrangement to provide the frictional engagement with the float.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A carburetor comprising a fuel bowl, means forming an inlet passage into said fuel bowl, said means including a tubular portion having a circular valve seat coaxially formed therein and comprising part of said fuel passage, an elongated valve fitted within said tubular portion for axial movement therein and having a valve surface at one end fitted to said valve seat to close said fuel passage, a float lever pivotally mounted in said fuel reservoir, said float lever having a surface portion in sliding contact with the other end of said elongated valve and normal to the axis of said tubular member and said elongated valve when said valve is closed, a float, a slot in said float, said float lever having an arm extending substantially at right angles to said float lever and extending into said slot, and resilient means fixed to said arm and pressing against the walls of said slot to adjustably hold said arm within said slot and to provide frictional engagement therewith.

2. A carburetor comprising a fuel bowl, means forming an inlet passage into said fuel bowl including a tubular inlet fitting forming a portion of said inlet passage, said inlet fitting comprising a circular valve seat surrounding said fuel passage, an elongated valve coaxially fitted within said tubular inlet fitting for axial movement therein and having a conical valve surface at one end fitted to said valve seat to close said fuel passage, the other end of said valve extending to the outside of said valve fitting, a float lever pivotally mounted in said fuel reservoir and having a first portion in sliding contact with said other valve end and substantially normal to the axis of said tubular member and said elongated valve when said valve is closed, a float of cellular closed cell material, and adjustable means conecting said float to said lever including a slot formed within said float, a second portion of said float lever extending substantially at right angles to said pivotal lever and into said slot, and resilient structure fixed to said second lever portion releasably holding it within said slot by pressing against the wall of said slot whereby relative movement between said float and said second lever portion is in a direction at substantially right angles only to said pivotal lever.

References Cited by the Examiner

UNITED STATES PATENTS

| 1,049,131 | 12/12 | Moritsky | 137—426 XR |
| 1,270,769 | 7/18 | Balch | 24—230 |
| 1,625,516 | 4/27 | Barger | 137—426 |
| 1,771,427 | 7/30 | Waterhouse. | |
| 2,066,523 | 1/37 | Ewart | 137—434 XR |
| 2,524,699 | 10/50 | Friedl | 137—426 XR |
| 2,747,605 | 5/56 | Adams | 73—322.5 |
| 2,753,886 | 7/56 | Powers | 73—322.5 |
| 3,049,010 | 8/62 | Holderith | 73—322.5 |

FOREIGN PATENTS

| 413,352 | 7/34 | Great Britain. |
| 567,153 | 1/45 | Great Britain. |

M. CARY NELSON, *Primary Examiner.*

ISADOR WEIL, ISAAC LISANN, WILLIAM F. O'DEA, *Examiners.*